(12) United States Patent
Krishna et al.

(10) Patent No.: US 6,925,085 B1
(45) Date of Patent: Aug. 2, 2005

(54) PACKET CLASSIFICATION USING HASH KEY SIGNATURES GENERATED FROM INTERRUPTED HASH FUNCTION

(75) Inventors: Gopal S. Krishna, San Jose, CA (US); Chandan Egbert, San Jose, CA (US); Somnath Viswanath, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 787 days.

(21) Appl. No.: 09/588,295

(22) Filed: Jun. 7, 2000

(51) Int. Cl.⁷ .............................................. H04L 12/28
(52) U.S. Cl. .................. 370/395.32; 370/389; 370/392
(58) Field of Search ........................ 711/216; 370/389, 370/401, 392, 465, 475, 395.32

(56) References Cited

U.S. PATENT DOCUMENTS

| | | | |
|---|---|---|---|
| 5,473,607 A * | 12/1995 | Huasmann et al. | |
| 5,768,526 A * | 6/1998 | Fawcett | |
| 5,949,786 A * | 9/1999 | Bellenger | 370/401 |
| 5,953,335 A | 9/1999 | Erimli et al. | |
| 5,958,057 A * | 9/1999 | Gianni | 713/310 |
| 6,018,526 A * | 1/2000 | Liu et al. | 370/401 |
| 6,034,958 A * | 3/2000 | Wicklund | 370/395.32 |
| 6,256,306 B1 * | 7/2001 | Bellenger | 370/389 |
| 6,567,408 B1 * | 5/2003 | Li et al. | 370/395.31 |
| 6,570,884 B1 * | 5/2003 | Connery et al. | 370/419 |
| 6,597,661 B1 * | 7/2003 | Bonn | 370/235 |
| 6,633,860 B1 * | 10/2003 | Afek et al. | 706/45 |
| 6,665,725 B1 * | 12/2003 | Dietz et al. | 709/230 |
| 6,674,769 B1 * | 1/2004 | Viswanath | 370/469 |
| 6,735,670 B1 * | 5/2004 | Bronstein et al. | 711/108 |

* cited by examiner

*Primary Examiner*—Kenneth Vanderpuye
(74) *Attorney, Agent, or Firm*—Manelli Denison & Selter PLLC; Leon R. Turkevich; Edward J. Stemberger

(57) ABSTRACT

A network switch, configured for performing layer 2 and layer 3 switching in an Ethernet (IEEE 802.3) network without blocking of incoming data packets, includes network switch ports, each including a packet classifier module configured for generating a packet signature based on information within a received data packet and hash action values specified within a user-programmable template. In particular, the network switch stores a plurality of user-programmable templates, each configured for identifying a corresponding class of data packet. Each user-programmable template includes hash action values specifying initiation and termination of a hash function based on a byte offset of a received data packet. The packet classifier module includes a hash generator configured for generating hash values for selected bytes of the received data packet, and a template translator configured for controlling the hash generator for hashing the selected bytes of the received data packet based on the hash action values specified by a corresponding user-programmable template. Hence, a unique hash signature can be generated by supplying a data frame having a prescribed data values at the selected bytes of the user-programmable template; the hash signature can then be stored for comparison with incoming data packets during network switching operations. Hence, data packets can be classified at the wire rate by performing a hash-based search of selected bytes of the received data packet.

15 Claims, 3 Drawing Sheets

PACKET CLASSIFICATION USING HASH KEY SIGNATURES GENERATED FROM INTERRUPTED HASH FUNCTION

BACKGROUND OF THE INVENTION

1. Field of the Invention

The present invention relates to switching of data packets in a non-blocking network switch configured for switching data packets between subnetworks.

2. Background Art

Local area networks use a network cable or other media to link stations on the network. Each local area network architecture uses a media access control (SAC) enabling network interface devices at each network node to access the network medium.

The Ethernet protocol IEEE 802.3 has evolved to specify a half-duplex media access mechanism and a full-duplex media access mechanism for transmission of data packets. The full-duplex media access mechanism provides a two-way, point-to-point communication link between two network elements, for example between a network node and a switched hub.

Switched local area networks are encountering increasing demands for higher speed connectivity, more flexible switching performance, and the ability to accommodate more complex network architectures. For example, commonly-assigned U.S. Pat. No. 5,953,335 discloses a network switch configured for switching layer 2 type Ethernet (IEEE 802.3) data packets between different network nodes; a received data packet may include a VLAN (virtual LAN) tagged frame according to IEEE 802.1q protocol that specifies another subnetwork (via a router) or a prescribed group of stations. Since the switching occurs at the layer 2 level, a router is typically necessary to transfer the data packet between subnetworks.

Efforts to enhance the switching performance of a network switch to include layer 3 (e.g., Internet protocol) processing may suffer serious drawbacks, as current layer 2 switches preferably are configured for operating in a non-blocking mode, where data packets can be output from the switch at the same rate that the data packets are received. Newer designs are needed to ensure that higher speed switches can provide both layer 2 switching and layer 3 switching capabilities for faster speed networks such as 100 Mbps or gigabit networks.

However, such design requirements risk loss of the non-blocking features of the network switch, as it becomes increasingly difficult for the switching fabric of a network switch to be able to perform layer 3 processing at the wire rates (i.e., the network data rate). For example, switching fabrics in layer 2 switches require only a single hash key to be generated from a MAC source address and/or a MAC destination address of an incoming data packet to determine a destination output port; the single hash key can be used to search an address lookup table to identify the output port. Layer 3 processing, however, requires implementation of user-defined policies that include searching a large number of fields for specific values. These user-defined policies may specify what type of data traffic may be given priority accesses at prescribed intervals; for example, one user defined policy may limit Internet browsing by employees during work hours, and another user-defined policy may assign a high priority to e-mail messages from corporate executives. Hence, the number of such user policies may be very large, posing a substantial burden on performance of layer 3 processing at the wire rates.

SUMMARY OF THE INVENTION

There is a need for an arrangement that enables a network switch to provide layer 2, layer 3 and above switching capabilities for 100 Mbps and gigabit links without blocking of the data packets.

There is also a need for an arrangement that enables a network switch to generate, store and match user programmable templates to classify packets at wire rates based on any data contained within the data packet.

There is also a need for an arrangement that enables a network switch to generate unique hash signatures for classification of data packets at the network wire rate according to respective user-defined policies.

These and other needs are attained by the present invention, where a network switch includes network switch ports, each including a packet classifier module configured for generating a packet signature based on information within a received data packet and hash action values specified within a user-programmable template.

One aspect of the present invention provides a method in a network switch. The method includes receiving a data packet on one of a plurality of network switch ports, and generating a packet signature of the received data packet by hashing selected portions of the received data packet based on prescribed hash action values of a user-programmable template. Generation of the packet signature by hashing selected portions of the received data packet based on prescribed hash action values of a user-programmable template enables flow-specific packet signatures to be generated and stored, enabling flow-based identification of data frames at wire speed, based on any user-selectable portion of the data frame.

Another aspect of the present invention provides a network switch comprising a table configured for storing user-programmable templates, a hash generator, and a comparator. Each user-programmable template includes hash action values that specify selected portions of a received data packet to be hashed for generation of a packet signature. The hash generator is configured for hashing the selected portions of a received data packet based on the hash action values to generate the packet signature for the received data packet. The comparator is configured for comparing the packet signature of the received data packet with at least one stored packet signature for classifying the received data packet relative to the corresponding user-programmable template and prescribed user-defined switching policies. Hashing selected portions of a received data packet enables the generation of a user-defined hash key that can be used for searching signatures according to the corresponding user-programmable template. In addition, the packet signature of the received data packet can be stored in a signature table, for example if the received data packet has prescribed packet data at the selected portions that specifies a prescribed data flow. Hence, the packet signature of the received data packet can be used to uniquely identify data flows, each having a corresponding unique packet signature stored in a signature table.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like element elements throughout and wherein.

BEST MODE FOR CARRYING OUT THE INVENTION

The disclosed embodiment is directed to a network switch having network switch ports, where each each network switch port includes a packet classifier module configured for identifying data flows by generating hash-based packet signatures for a data packet based on hash action values specified within a user-programmable template. In particular, the network switch stores a plurality of user-programmable templates, each configured for identifying a corresponding class of data packet. Each user-programmable template includes hash action values specifying initiation and termination of a hash function based on a byte offset of a received data packet. The packet classifier module includes a hash generator configured for generating hash values for selected bytes of the received data packet, and a template translator configured for controlling the hash generator for hashing the selected bytes of the received data packet based on the hash action values specified by a corresponding user-programmable template. Hence, a unique hash signature can be generated by supplying a data frame having prescribed data values at the selected bytes of the user-programmable template; the hash signature can then be stored for comparison with incoming data packets during network switching operations. Hence, data packets can be classified at the wire rate by performing a hash-based search of selected bytes of the received data packet.

Figure 1:
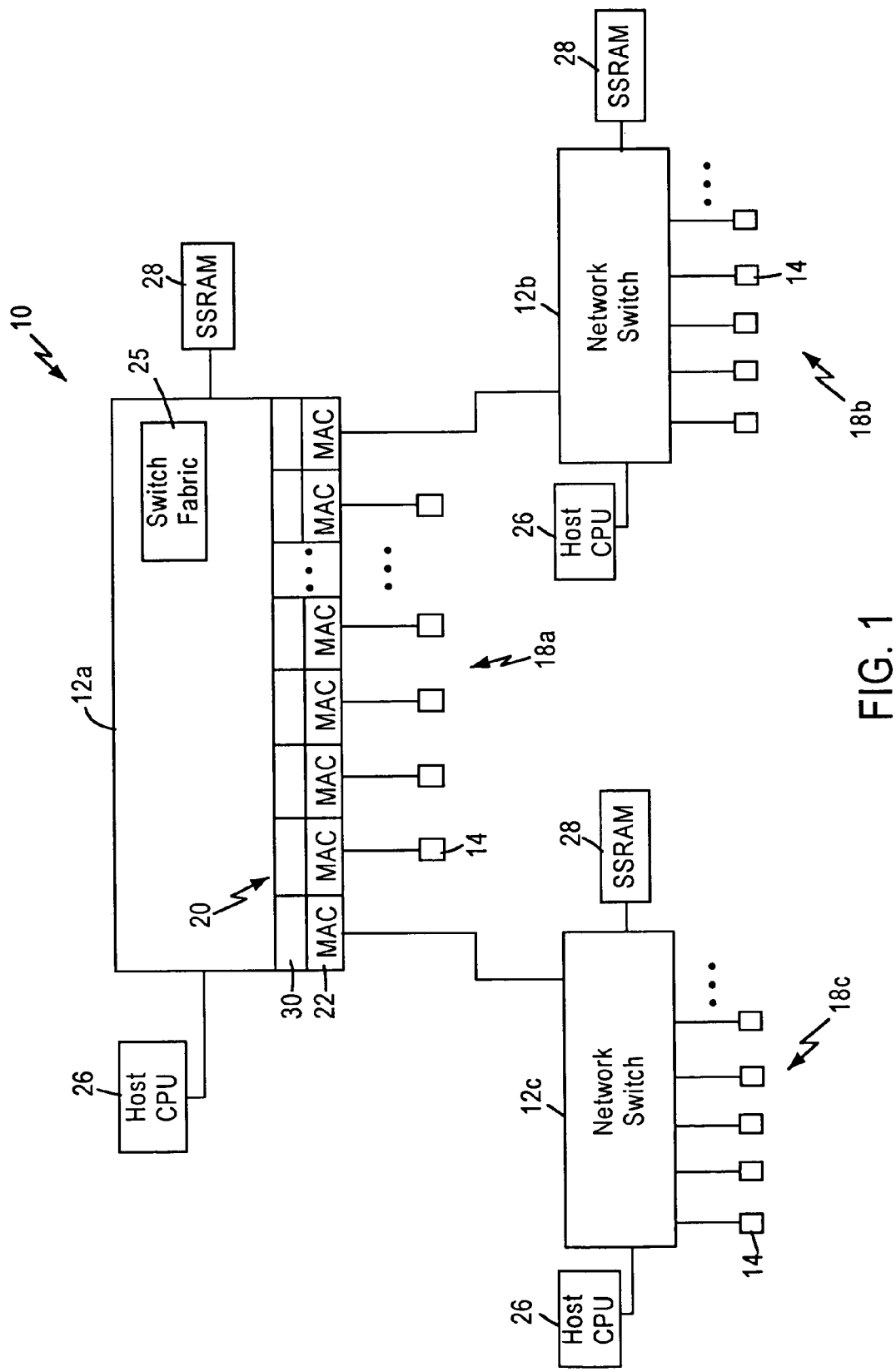
FIG. 1 is a block diagram of a packet switched network including multiple network switches for switching data packets between respective subnetworks according to an embodiment of the present invention.

FIG. 1 is a block diagram illustrating a packet switched network 10, such as an Ethernet (IEEE 802.3) network. The packet switched network includes integrated (i.e., single chip) multiport switches 12 that enable communication of data packets between network stations 14. Each network station 14, for example a client workstation, is typically configured for sending and receiving data packets at 10 Mbps or 100 Mbps according to IEEE 802.3 protocol. Each of the integrated multiport switches 12 are interconnected by gigabit Ethernet links 16, enabling transfer of data packets between subnetworks 18a, 18b, and 18c. Hence, each subnetwork includes a switch 12, and an associated group of network stations 14.

Each switch 12 includes a switch port 20 that includes a media access control (MAC) module 22 that transmits and receives data packets to the associated network stations 14 across 10/100 Mbps physical layer (PHY) transceivers (not shown) according to IEEE 802.3u protocol. Each switch 12 also includes a switch fabric 25 configured for making frame forwarding decisions for received data packets. In particular, the switch fabric 25 is configured for layer 2 switching decisions based on source address, destination address, and VLAN information within the Ethernet (IEEE 802.3) header; the switch fabric 25 is also configured for selective layer 3 and above switching decisions based on evaluation of an IP data packet within the Ethernet packet.

As shown in FIG. 1, each switch 12 has an associated host CPU 26 and a buffer memory 28, for example an SSRAM. The host CPU 26 controls the overall operations of the corresponding switch 12, including programming of the switch fabric 25. The buffer memory 28 is used by the corresponding switch 12 to store data frames while the switch fabric 25 is processing forwarding decisions for the received data packets.

As described above, the switch fabric 25 is configured for performing layer 2 switching decisions and layer 3 switching decisions. Use of layer 3 switching decisions by the switch fabric 25 enables the switch fabric 25 to make intelligent decisions as far as how to handle a packet, including advanced forwarding decisions, and whether a packet should be considered a high-priority packet for latency-sensitive applications, such as video or voice. Use of layer 3 switching decisions by the switch fabric 25 also enables the host CPU 26 of switch 12a to remotely program another switch, for example switch 12b, by sending a message having an IP address corresponding to the IP address of the switch 12b; the switch 12b, in response to detecting a message addressed to the switch 12b, can forward the message to the corresponding host CPU 26 for programming of the switch 12b.

According to the disclosed embodiment, each switch port 20 of FIG. 1 includes a packet classifier module 30 that is configured for classifying received data packets based on user-programmable templates, described below, enabling the switching fabric 25 in response to execute the appropriate layer 3 switching decision. Specifically, users of the host processor 26 will specify policies that define how certain data packets should be handled by the switch fabric 25. For example, certain data packets may require special switching operations, where the data packets may be uniquely identified by any one of a specific value for a IP source address, an IP destination address, a transmission control protocol (TCP) source port, a TCP destination port, a user datagram protocol (UDP) source port, and/or a UDP destination port, or any combination thereof. However, implementing a layer 3 lookup within the switch fabric 25 would impose extremely heavy processing requirements on the switch fabric 25, preventing the switch fabric 25 from performing layer 3 processing in real-time. In particular, the switch fabric 25 would need to perform multiple key searches for each of the address fields (IP source and destination address, TCP source and destination port, UDP source and destination port) in order to uniquely identify the specific layer 3 switching decision corresponding to the unique combination of the layer 3 address fields in a received data packet.

According to the disclosed embodiment, the packet classifier module 30 is configured for classifying a received data packet, and uniquely identifying the received data packet, based on prescribed user-selected portions of the received data packet. In particular, the packet classifier module 30 is able to efficiently generate, store, and match user programmable templates to classify packets based on any portion of frame data within the received data packet.

Figure 2:
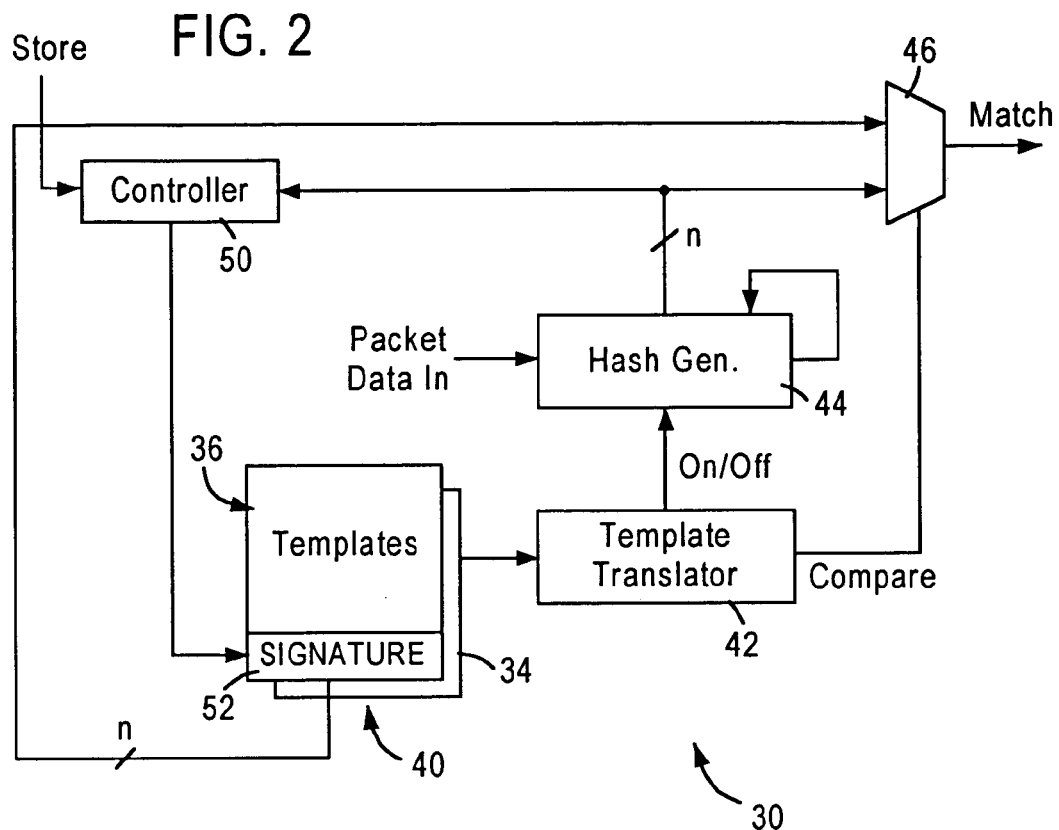
FIG. 2 is a block diagram illustrating in detail the packet classifier module of FIG. 1 according to an embodiment of the present invention.
Figure 3:
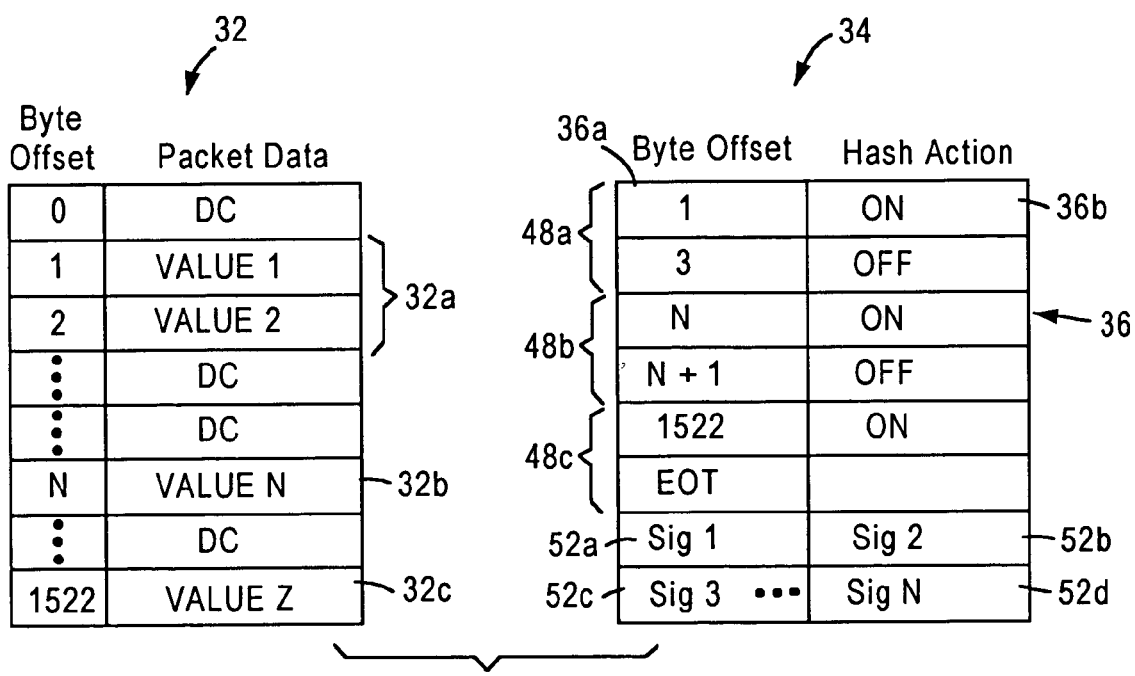
FIG. 3 is a diagram illustrating a received data packet and a user-programmable template used to hash selected portions of the received data packet.

FIG. 2 is a diagram illustrating in detail the packet classifier module 30 according to an embodiment of the present invention. FIG. 3 is a diagram illustrating a data packet 32 and a user-programmable template 34 used to generate a packet signature by hashing selected portions of the received data packet. The packet classifier 30 includes a template table 40 configured for storing the user-programmable templates 34. The packet classifier 30 also includes a template translator 42, a hash generator 44, and a comparator 46.

Each user-programmable template 34 stored in the template table 40 includes hash action values 36 that specify selected portions of a received data packet to be hashed for generation of a packet signature. In particular, each hash action value 36 specifies a location offset 36a (e.g., a byte offset) relative to the beginning of the received data packet and a hash action 36b. The hash action 36b specifies either an initiate hash action ("on") for initiation of hashing by the hash generator 44, or a halt hash action ("off") specifying halting of hashing by the hash generator 44. For example, the template 34 illustrates that the hash generator 44 is turned on at byte offset 1 and then turned off at byte offset 3, enabling the hashing of the data packet portion 32a. Hence, each hash action value pair 48 specifies a corresponding portion of the data packet 32 that should be hashed by the hash generator 44, such that the hash action value pairs 48a, 48b, and 48c control the hash generator 44 for hashing the portions 32a, 32b and 32c of the data packet, respectively.

The packet classifier module 30 also includes a template controller 50 configured for storing, in response to a store signal, the packet signature of the received data packet 32 as a stored packet signature 52 for the corresponding user-programmable template 34, representing one of the prescribed user-defined switching policies. In particular, the template 34 may store a plurality of packet signatures 52a, 52b, 52c, etc., each having a unique value based on a corresponding prescribed value within at least one of the selected portions 32a, 32b, and 32c. During reception of an unknown data packet, the packet signature for the received data packet can be simultaneously compared with the multiple signatures 52a, 52b, 52c, etc. that belong to the corresponding user-programmable template to classify the received data packets based on the user-selected portions 32a, 32b, 32c, etc. Hence, the storage of a packet signature having prescribed data, for example a prescribed flow identifier, enables the packet classifier module 30 to identify unique data flows based on detecting a correlation by the comparator 46 between one of the stored packet signatures 52, and the packet signature generated for a received data packet.

Figure 4:
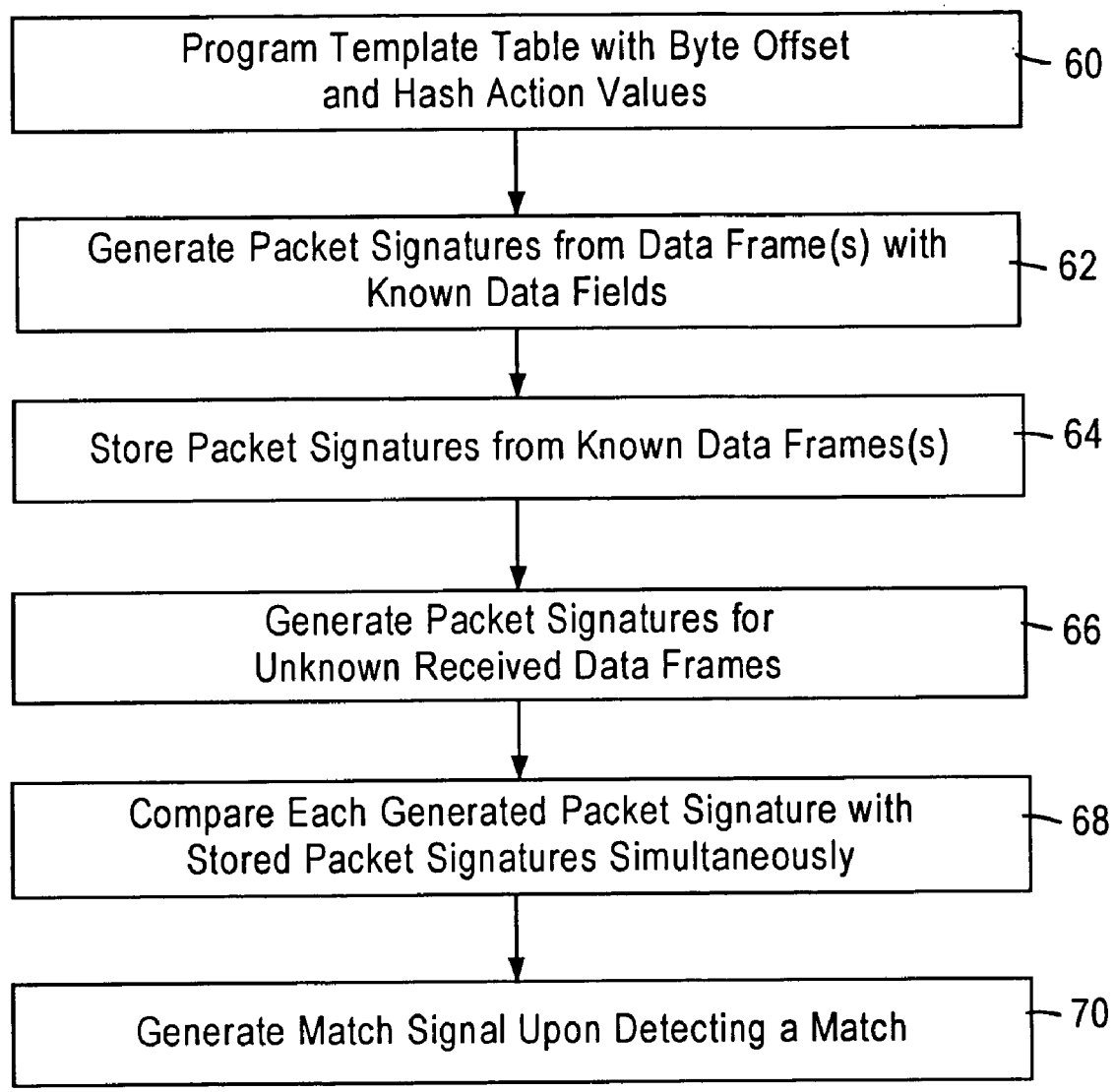
FIG. 4 is a diagram illustrating the method of classifying data packets by hashing selected portions of the received data packet according to an embodiment of the present invention.

FIG. 4 is a diagram illustrating the method of classifying data packets by hashing selected portions of the received data packet according to an embodiment of the present invention. The template table 40 is first programmed in step 60 with at least the location offset values 36a and the hash actions 36b by a user of the host CPU. Packet signatures 52 for prescribed user-defined switching policies are then generated in step 62 by supplying to the hash generator 44 a known data frame, namely a data frame having prescribed data values at the selected portions 32a, 32b and 32c that are known to match the user-defined switching policies. The packet signatures 52 for the known data frame(s) are then stored in step 64 in the template 34 for later comparison with unknown data frames. Note that the storage of the packet signature 52 may be initiated, for example, by the host CPU detecting the beginning of a prescribed data flow, for example an IGMP frame.

After storage of the packet signatures 52 in the template 34, the packet classifier 30 then begins generating packet signatures for the received data frames having unknown frame data values in step 66. The template translator 42 controls the hash generator 44 by selectively enabling and disabling the hash generator 44 based on the location offset values 36a and the hash action values 36b. The comparator 46 then simultaneously compares the generated packet signature for the received data frame with the stored packet signatures 52 in step 68, and outputs a match signal in step 70 if a match is detected between the packet signature for the received data packet and one of the stored packet signatures 52. The match signal can then be used by the switching fabric 25 to execute the appropriate switching decision.

According to the disclosed embodiment, user programmable templates can be efficiently generated to classify packets based on any field contained within the packet. Hence, packet signatures for any type of data flow can be stored and processed the wire speed, enabling flow based identification within each network switch port at the wire rate. Moreover, the packet signature generated for a received data packet can be simultaneously compared with any number of stored packet signatures to determine a match, merely by increasing the number of comparators.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an integrated network switch, the method comprising:
   receiving a data packet on one of a plurality of network switch ports of the integrated network switch; and
   generating a packet signature, by the one network switch port, of the received data packet by hashing selected portions of the received data packet based on prescribed hash action values of a user-programmable template.

2. The method of claim 1, wherein the network switch includes a hash generator, the generating step including:
   hashing the selected portions based on a first group of the hash action values specifying initiating the hash generator at a beginning of the selected portions, respectively; and
   halting the hash generator based on a second group of the hash action values specifying halting the hash generator at an end of the selected portions, respectively.

3. The method of claim 2, wherein the selected portions of the received data packet have prescribed data values matching the user-programmable template, the method further including storing the packet signature of the data packet in a memory for the corresponding user-programmable template.

4. The method of claim 3, further comprising:
   receiving a second data packet on the one network switch port;
   generating the packet signature for the second data packet by the one network switch port; and
   comparing the packet signature for the second data packet with the stored packet signature for classification of the second data packet relative to the user-programmable template.

5. The method of claim 4, wherein the comparing step includes simultaneously comparing the packet signature for the second data packet with a plurality of the stored packet signatures for classification of the second data packet relative to a plurality of the user-programmable templates, respectively.

6. The method of claim 5, wherein each of the network switch ports include a packet classifier module having the hash generator, the step of simultaneously comparing the packet signature for the second data packet with a plurality of the stored packet signatures being performed in the corresponding packet classifier module of the one network switch port having received the second data packet.

7. The method of claim 1, further comprising simultaneously comparing the packet signature with a plurality of stored packet signatures for classification of the data packet relative to a plurality of the user-programmable templates, respectively.

8. The method of claim 1, wherein the selected portions of the received data packet have prescribed data values matching the user-programmable template, the method further including storing the packet signature of the data packet in a memory for the corresponding user-programmable template.

9. The method of claim 8, further comprising:
receiving a second data packet on the one network switch port;
generating the packet signature for the second data packet by the one network switch port; and
comparing the packet signature for the second data packet with the stored packet signature for classification of the second data packet relative to the user-programmable template.

10. The method of claim 9, wherein the comparing step includes simultaneously comparing the packet signature for the second data packet with a plurality of the stored packet signatures for classification of the second data packet relative to a plurality of the user-programmable templates, respectively.

11. The method of claim 1, wherein the user-programmable template includes a plurality of hash action values, the generating step including:
initiating hashing of a first of the selected portions based on a first of the hash action values specifying starting hashing at a prescribed beginning of the first of the selected portions; and
halting hashing for the first of the selected portions based on a second of the hash action values specifying halting hashing at a prescribed end of the first of the selected portions.

12. A network switch comprising:
a table configured for storing user-programmable templates, each user-programmable template including hash action values that specify selected portions of a received data packet to be hashed for generation of a packet signature;
a hash generator configured for hashing the selected portions of received data packet based on the hash action values to generate the packet signature for the received data packet; and
a comparator configured for comparing the packet signature of the received data packet with at least one stored packet signature for classifying the received data packet relative to the corresponding user-programmable template and prescribed user-defined switching policies,
wherein the network switch includes a plurality of network switch ports each including the hash generator and comparator.

13. The switch of claim 12, further comprising a template controller configured for storing the packet signature of the received data packet for the corresponding user-programmable template as one of the prescribed user-defined switching policies in response to a store signal.

14. The switch of claim 12, wherein each hash action values specifies a location offset relative to a beginning of the received data packet, and one of an initiate hash action specifying initiation of hashing by the hash generator at the corresponding location offset and a halt hash action specifying halting of hashing by the hash generator at the corresponding location offset.

15. The method of claim 1, wherein the network switch is implemented on a single chip, the steps of receiving and generating being performed in the single chip.

* * * * *